US012698415B2

(12) United States Patent
Kalsani et al.

(10) Patent No.: US 12,698,415 B2
(45) Date of Patent: Aug. 4, 2026

(54) EPOXY POLYSILOXANE COATING COMPOSITIONS WITH POLYURETHANE-METAL OR ORGANIC BASED CURING SYSTEMS

(71) Applicant: PPG Industries Ohio, Inc., Cleveland, OH (US)

(72) Inventors: Venkateshwarlu Kalsani, Gibsonia, PA (US); Chinming Hui, Pittsburgh, PA (US); James Dean Begley, Evans City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 565 days.

(21) Appl. No.: 18/254,950

(22) PCT Filed: Dec. 2, 2021

(86) PCT No.: PCT/US2021/061551
§ 371 (c)(1),
(2) Date: May 30, 2023

(87) PCT Pub. No.: WO2022/120013
PCT Pub. Date: Jun. 9, 2022

(65) Prior Publication Data

US 2024/0002695 A1 Jan. 4, 2024

Related U.S. Application Data

(60) Provisional application No. 63/120,899, filed on Dec. 3, 2020.

(51) Int. Cl.
*C09D 183/06* (2006.01)
*C09D 7/65* (2018.01)
*C09D 163/00* (2006.01)

(52) U.S. Cl.
CPC ............ *C09D 183/06* (2013.01); *C09D 7/65* (2018.01); *C09D 163/00* (2013.01)

(58) Field of Classification Search
CPC .................................................. C09D 183/06
USPC ........................................................ 523/212
See application file for complete search history.

(56) References Cited

U.S. PATENT DOCUMENTS 4,233,428 A 11/1980 Endo
4,250,074 A 2/1981 Foscante et al.
4,252,933 A 2/1981 Sumida
4,910,252 A 3/1990 Yonehara et al.
5,618,860 A 4/1997 Mowrer et al.
5,691,019 A 11/1997 Carroll et al.
5,760,155 A 6/1998 Mowrer et al.
5,804,616 A 9/1998 Mowrer et al.
5,889,124 A 3/1999 Ando et al.
6,071,990 A 6/2000 Yip et al.
6,281,321 B1 8/2001 Kelly et al.
6,313,335 B1 11/2001 Roberts et al.
6,485,838 B1 11/2002 Shimada et al.
7,244,797 B2 7/2007 Kurihara et al.
8,722,815 B2 5/2014 Huang et al.
8,722,835 B2 5/2014 Mowrer et al.
8,846,827 B2 9/2014 Mowrer
2006/0058451 A1 3/2006 Gommans et al.
2006/0210807 A1 9/2006 Miller
2007/0042199 A1 2/2007 Chisholm et al.
2007/0129528 A1 6/2007 Huang et al.
2008/0181862 A1 7/2008 Chisholm et al.
2008/0213599 A1 9/2008 Webster et al.
2009/0048394 A1 2/2009 Gommans et al.
2014/0088219 A1 3/2014 Chen et al.
2014/0308451 A1 10/2014 Westhoff et al.
2015/0024157 A1 1/2015 Tullberg

FOREIGN PATENT DOCUMENTS

AU 2842997 A * 1/1999 ........... C09D 183/04
CN 1247547 A 3/2000
CN 101052671 A 10/2007
CN 101336258 A 12/2008
CN 102504524 A 6/2012
CN 103339165 A 10/2013
CN 103492486 A 1/2014
CN 104159980 A 11/2014
CN 110467711 A 11/2019
WO 2009025924 2/2009
WO 2009106525 9/2009

OTHER PUBLICATIONS

International Search Report and Written Opinion received for PCT Application Serial No. PCT/US2021/061551 dated Mar. 9, 2022, 9 pages.

* cited by examiner

*Primary Examiner* — Randy P Gulakowski

(57) ABSTRACT

Disclosed herein are epoxy-polysiloxane polymer coating compositions suitable for coating surfaces that provide excellent chemical, corrosion, or weather resistance. The epoxy-polysiloxane polymer coating compositions include polysiloxane and non-aromatic epoxide resins, and a cure system, wherein the combined composition reacts to form a cross-linked epoxy-polysiloxane polymer structure. The cure system can include at least a blend of metal or organic catalyst(s) and alkoxy functional aminosilane(s), and may further include a polyurethane, such as a silane terminated polyurethane. The metal catalyst may be coordinated with, or in close proximity to, the polyurethane, thus providing excellent hardening results at very low metal concentrations.

19 Claims, No Drawings

EPOXY POLYSILOXANE COATING COMPOSITIONS WITH POLYURETHANE-METAL OR ORGANIC BASED CURING SYSTEMS

CROSS-REFERENCE TO RELATED APPLICATIONS

This application is a U.S. national stage filing under 35 U.S.C. § 371 of International Application No. PCT/US2021/061551, filed on Dec. 2, 2021, which claims the benefit of priority under 35 U.S.C. § 119(e) of prior U.S. Provisional Application Ser. No. 63/120,899, filed Dec. 3, 2020, under 35 U.S.C. 119, titled "Epoxy Polysiloxane Coating Compositions With Polyurethane-Metal Curing Systems" which is incorporated herein by reference.

TECHNICAL FIELD

The present disclosure is directed to epoxy polysiloxane coating compositions useful for protective coatings and the like and, more specifically, to epoxy-polysiloxane polymer compositions hardened with polyurethane-metal or organic based cure systems.

BACKGROUND

Epoxy siloxane coatings have gained commercial acceptance as protective and decorative coatings for steel, aluminum, galvanizing, wood and concrete in the maintenance, marine, construction, architectural, aircraft, automotive, flooring, and product finishing markets. Such coatings typically demonstrate varied cure rates and/or concentration requirements for the hardeners to accommodate different relative humidity conditions. Hardeners that provide cure rates substantially independent of relative humidity are desired.

SUMMARY

The present disclosure provides an epoxy-polysiloxane polymer coating composition that includes a polysiloxane, a non-aromatic epoxide resin, and a cure system that includes (i) a polyurethane with a metal catalyst and (ii) an alkoxy functional aminosilane.

The present disclosure further provides an epoxy-polysiloxane polymer coating composition that includes a polysiloxane, a non-aromatic epoxide resin, and a cure system that includes (a) a silane-terminated polyurethane and (b) an alkoxy functional aminosilane, wherein the silane-terminated polyurethane (a) comprises the reaction product of reactants that include (i) a polyurethane prepolymer component that includes a reaction product of reactants including a polyisocyanate, a polyol, and a metal or organic based catalyst, and (ii) an alkoxy functional silane different from the alkoxy functional aminosilane (b), wherein the metal catalyst is coordinated with the silane-terminated polyurethane.

The present disclosure further provides an epoxy-polysiloxane polymer coating composition including: a polysiloxane having the formula:

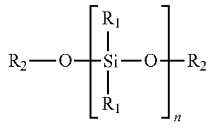

where each $R_1$ is independently selected from a hydroxy group or an alkyl, aryl, or alkoxy group having up to six carbon atoms, each $R_2$ is independently selected from hydrogen, or an alkyl or aryl group having up to six carbon atoms, and n is selected so that the molecular weight for the polysiloxane is 400 to 10,000 g/mol; a non-aromatic epoxide resin having more than one 1,2-epoxide group per molecule and an epoxide equivalent weight of 100 to 5,000 g/mol; and a cure system including zinc amidine and an alkoxy functional aminosilane.

The present disclosure also relates to substrates having at least a portion of one surface coated with any of the coating compositions disclosed herein, and methods for coating a surface with any of the coating compositions disclosed herein.

DETAILED DESCRIPTION

The present disclosure provides epoxy-polysiloxane coating compositions including a unique cure system that affords cure rates substantially independent of relative humidity. For example, the cure systems disclosed herein may provide dry hard times for the coating composition on a substrate that are essentially the same at 20% and 60% relative humidity (such as measured according to ASTM-D5895 at 21° C.). As used herein, "essentially the same" may be understood to mean values of a measurement that deviate from each other by less than 15%, such as 10%, or even 5% (i.e., a first measured value is within 20%, 10%, or even 5% of a second measured value). Thus, for example, dry hard times of a coating composition that are essentially the same at 60% relative humidity (RH) and 20% RH would have a difference of 20% or less.

Moreover, the presently disclosed cure systems also provide an alternative to traditional tin catalysts, affording improved dry hard times at lower concentrations of the metal catalyst, such as when compared to compositions absent certain components of the cure system. For example, cure systems including a unique silane-terminated polymer and metal catalyst provide faster dry hard times at lower concentrations of the metal catalyst than cure systems absent the silane-terminated polymer.

Additionally, an organic based catalyst, as nonlimiting examples, amine-based catalysts, such as tertiary amines and quaternary ammonium salt based curing systems, can be used either alone or in combination with the metal catalysts described herein.

Throughout this description and in the appended claims, use of the singular includes the plural and plural encompasses singular, unless specifically stated otherwise. For example, although reference is made herein to "an" epoxy resin, "a" siloxane, and "the" metal catalyst, one or more of any of these components or any other components described herein can be used.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The words "including" and "comprising" as well as forms of the words "including" and "comprising", as used in this description and in the claims, does not limit the present invention to exclude any variants or additions. Additionally, although the present invention has been described in terms of "including" or "comprising", coating compositions detailed herein may also be described as consisting essentially of or consisting of. For example, while the invention has been described in terms of a coating composition including an epoxy resin, a polysiloxane, and a cure system, a coating composition consisting essentially of an epoxy resin, a polysiloxane, and a cure system is also within the present scope. In this context, "consisting essentially of" means that any additional coating components will not materially affect the cure rate, i.e., at least the dry hard times, or the independence of the cure rate from the relative humidity of the coating composition or coating deposited therefrom.

As used herein, the term "multi-component" refers to coating compositions that include more than one component, such as those that include two components ("2K systems"), wherein the components are stored separately and then mixed at or near the time of use. The present coating compositions can be multi-component, such as 2K systems. When reference is made herein to the "blended coating composition" it refers to the composition resulting when all the components are mixed, such as just prior to application.

Furthermore, the use of "or" means "and/or" unless specifically stated otherwise. As used herein, the term "polymer" refers to prepolymers, oligomers and both homopolymers and copolymers, and the prefix "poly" refers to two or more. "Including" and like terms means including, but not limited to. When ranges are given, any endpoints of those ranges and/or numbers within those ranges can be combined within the scope of the present invention.

Unless otherwise indicated, molecular weights are reported as weight average molecular weights determined by gel permeation chromatography relative to appropriate polystyrene standards with the unit of g/mol.

As used herein, the terms "organic catalyst" and "organic based curing system" refer to organic compounds that include at least one hetero atom, nonlimiting examples include bicycloguanidines, imidazoles, aliphatic or cyclic amines, phosphonium salts, phenolic or sulphonic acids or salts, tertiary amines, and quaternary ammonium salts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

The present disclosure provides an epoxy-polysiloxane polymer coating composition suitable for coating surfaces that provides excellent chemical, corrosion, or weather resistance. The epoxy-polysiloxane polymer coating may include a resin component including a polysiloxane and a non-aromatic epoxide resin, and a cure system, wherein the combined composition reacts to form a cross-linked epoxy-polysiloxane polymer structure. The cure system includes a blend of metal or amine-based catalyst(s) and alkoxy functional aminosilane(s).

The polysiloxane of the resin component includes polymers having Formula I:

(I)

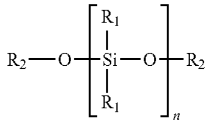

wherein each $R_1$ may be selected from hydroxy group and alkyl, aryl, and alkoxy groups having up to six carbon atoms. Each $R_2$ may be selected from hydrogen and alkyl and aryl groups having up to six carbon atoms. In Formula I, n may be an integer selected so that the molecular weight of the polysiloxane is in the range of 400 to 10,000 g/mol. $R_1$ and $R_2$ may include groups having less than six carbon atoms, for example, to facilitate rapid hydrolysis of the polysiloxane, wherein the reaction may be driven by the volatility of the alcohol analog product of the hydrolysis. Selection of $R_1$ and $R_2$ groups having greater than six carbon atoms may impair hydrolysis of the polysiloxane due to the relatively low volatility of each alcohol analog. Methoxy, ethoxy and silanol functional polysiloxanes having an "n" selected such that the molecular weights are 400 to 2000 g/mol may be used for formulating coating compositions of the present disclosure.

Nonlimiting examples of methoxy functional polysiloxanes include: DC-3074 and DC-3037 commercially available from Dow Corning Corp.; and GE SR191 and SY-550 commercially available from Wacker. Exemplary silanol functional polysiloxanes include, but are not limited to, Dow Corning's DC840. The coating composition can include 15% by weight or greater of the polysiloxane, such as 20 wt. % or greater, or 30 wt. % or greater, or 40 wt. % or greater, or 50 wt. % or greater, or can include 70% by weight or lower of the polysiloxane, such as 60 wt. % or lower, or 50 wt. % or lower, or 40 wt. % or lower. For example, the coating composition can include 15% to 70% by weight of the polysiloxane, such as 15% to 60% by weight of the polysiloxane, or any other range combination using any of these upper and lower endpoints.

Nonlimiting examples of epoxy resins useful in forming coating compositions of this disclosure may include non-aromatic epoxy resins that contain more than one 1,2-epoxy groups per molecule, such as two 1,2-epoxy groups per molecule. The terms "epoxide resin" and "epoxy resin," as used herein, are interchangeable. The epoxide resins may be liquid rather than solid and may have an epoxide equivalent weight of 100 to 5,000 g/mol, such as 100 to 2,000 g/mol, or even 100 to 500 g/mol, and have a reactivity of about two.

Nonlimiting examples of epoxide resins may be non-aromatic hydrogenated cyclohexane dimethanol and diglycidyl ethers of hydrogenated Bisphenol A-type epoxide resin, such as Eponex 1510, and Eponex 1513 (hydrogenated bisphenol A-epichlorohydrin epoxy resin) of Hexion; and Epodil 757 (cyclohexane dimethanol diglycidylether) of Evonik; Araldite epoxies Ciba Geigy; Aroflint 393 and 607 of Reichold; and ERL4221 commercially available from Union Carbide. Other suitable non-aromatic epoxy resins may include EP-4080E (cycloaliphatic epoxy resin) commercially available from Adeka, Japan; and DER 732 and DER 736 of Palmer Holland.

In specific examples, the epoxy resin may be EP-4080E. Such non-aromatic hydrogenated epoxide resins may be desired for their limited reactivity of about two, which promote formation of a linear epoxy polymer and prohibits formation of a cross-linked epoxy polymer. The coating composition may include 20% to 70% by weight of the epoxide resin, such as 15% to 60% by weight of epoxide resin.

The coating composition may include 70% to 90% of the polysiloxane and non-aromatic epoxy resin, wherein the polysiloxane and non-aromatic epoxy resin may be supplied in a ratio of 20:80 to 80:20.

The cure system can include a blend of metal catalyst(s) and alkoxy functional aminosilane(s). The alkoxy functional aminosilane may include trialkoxy functional aminosilanes having formula (II):

(II)

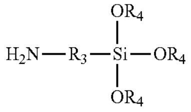

wherein $R_3$ may be a difunctional organic radical independently selected from aryl, alkyl, dialkylaryl, alkoxyalkyl, alkylaminoalkyl, and cycloalkyl radicals, each alkyl, aryl, cycloalkyl, and alkoxy group containing up to 6 carbon atoms, and each $R_4$ may be independently selected from alkyl, hydroxyalkyl, alkoxyalkyl or hydroxyalkoxyalkyl groups wherein each alkyl, aryl, cycloalkyl, and alkoxy group in the $R_4$ group contains up to 6 carbon atoms. Each $R_3$ may be independently chosen from $(C_1\text{-}C_6)$alkyl groups and each $R_4$ is independently chosen from $(C_1\text{-}C_6)$alkyl groups and $(C_1\text{-}C_6)$alkylamino$(C_1\text{-}C_6)$alkyl groups.

Other suitable trialkoxy functional aminosilanes include those having formula (III):

$$Y—Si—(O—R_4)_3 \qquad (III)$$

wherein Y may be $H(HNR_8)_c$ and "c" is an integer of from 1 to 6, $R_4$ is as defined above, and each $R_8$ may be a difunctional organic radical independently selected from aryl, alkyl, dialkylaryl, alkoxyalkyl, and cycloalkyl radicals.

Nonlimiting examples of trialkoxy functional aminosilanes include aminopropyl trimethoxysilane, aminopropyl triethoxysilane, aminopropyl tripropoxysilane, aminoneohexyl trimethoxysilane, N-β-(aminoethyl)-γ-aminopropyl trimethoxysilane, N-β-(aminoethyl)-γ-aminopropyl triethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, trisaminopropyl trismethoxy ethoxy silane, aminoethyl aminopropyl triethoxysilane, aminoethyl aminopropyl trimethoxysilane, γ-aminopropylmethyl dimethoxysilane, γ-aminopropylmethyl diethoxysilane, N-β-(aminoethyl)-γ-aminopropymethyl diethoxysilane, and N-β-(aminoethyl)-γ-aminopropylmethyl dimethoxysilane.

Nonlimiting examples of commercially available trialkoxy functional aminosilanes include SILQUEST® A-1100 (aminopropyl trimethoxysilane having an amine equivalent weight of 89.7), SILQUEST® A-1110 (aminopropyl triethoxysilane having an amine equivalent weight of 111), SILQUEST® A-1120 (N-β-(aminoethyl)-γ-aminopropyl trimethoxysilane), and SILQUEST® A-1637, commercially available from Momentive. Additional suitable commercially available trialkoxy functional aminosilanes also include Z6020, Z6011, XI-6100, and X16150 of Dow Corning; Silquest A1101, A1102, A1108, A1126, A1130, A1387, A-2120 and A2639 of Momentive; and CoatOSil 2810, Dynasylan AMMO, AMEO-T, DAMO, TRIAMO, 1122, 1146, 1189, and 1505 all manufactured of Evonik; and KBE-602, KBE-603 and KBE-903 manufactured by Shin-Etsu.

The cure system can include a metal catalyst. The metal catalyst may be in the form of an organometallic catalyst including a metal selected from zinc, manganese, zirconium, titanium, cobalt, iron, lead, aluminum, bismuth, or tin. Nonlimiting exemplary metal catalysts include the formula (IV):

(IV)

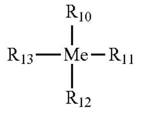

wherein Me is the metal, $R_{10}$ and $R_{11}$ may be independently selected from acyl, alkyl, aryl, or alkoxy groups having up to twelve carbon atoms, and $R_{12}$ and $R_{13}$ may be selected from those groups set forth for $R_{10}$ and $R_{11}$ or from inorganic atoms such as halogens, sulfur, or oxygen. The $R_{10}$, $R_{11}$, $R_{12}$ and $R_{13}$ groups may be selected from butyl, acetates, laurates, octanoates, neodecanoates or naphthanates.

Nonlimiting examples of metal catalysts include organometallic tin catalysts, such as, for example, dibutyl tin dilaurate, dibutyl tin diacetate, dibutyl tin diacetyldiacetonate, dioctyltindilaurate, dioctyltindiacetate, or organotitanates. Further nonlimiting examples of metal catalysts include zinc, zirconium, bismuth, or aluminum amidine catalysts such as a zinc (II) amidine complex. A nonlimiting example of a metal amidine complex can have the formula $Me(A)_2(C)_2$ wherein A represents an amidine, C represents a carboxylate, and Me represents the metal, such as zinc, zirconium, bismuth, or aluminum. In a nonlimiting examples of a metal amidine complex, C may be an aliphatic, aromatic, or polymeric carboxylate with an equivalent weight of 45 to 465, and A may be an amidine represented by the formula (V) or (VI):

(V)

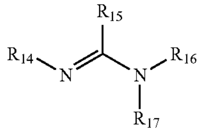

(VI)

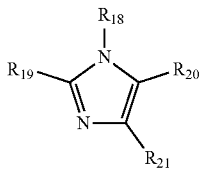

wherein $R_{14}$ represents hydrogen, an organic group attached through a carbon atom, an amine group which can be substituted, for example by an optionally substituted hydrocarbyl group, or a hydroxyl group which can be etherified, for example with an optionally substituted hydrocarbyl group having up to 8 carbon atoms; $R_{15}$ and $R_{16}$ each independently represent hydrogen or an organic group attached through a carbon atom or are joined to one another to form (with the linking —N═C—N—) a heterocyclic ring, with hetero atom(s) or a fused bicyclic ring with heteroatom(s); and $R_{17}$ represents hydrogen, an organic group attached through a carbon atom or a hydroxy group which can be etherified, for example with an optionally substituted hydrocarbyl group having up to 8 carbon atoms.

Nonlimiting examples of amidines include those in which the pair $R_{15}$-$R_{16}$ or $R_{15}$—$R_{17}$ forms a 5 to 7 membered ring that includes the two amidine nitrogen atoms and one of the pairs $R_{15}$-$R_{16}$ or $R_{15}$—$R_{17}$ forms a 5 to 9 membered ring that includes one amidine nitrogen atom and carbon atoms. Particular catalytic amidine groups are those in which the groups $R_{15}$ and $R_{16}$ are joined to form (with the linking —N═C—N—) a heterocyclic ring, for example an imidazoline, imidazole, tetrahydropyrimidine, dihydropyrimidine or pyrimidine ring. Acyclic amidines and guanidines can alternatively be used.

Nonlimiting examples of amidines further include imidazole derivatives of the general formula (VI), wherein $R^{18}$, $R^{19}$, $R^{20}$, and $R^{21}$ are independently represent hydrogen, alkyl, or substituted alkyl, hydroxyalkyl, aryl, aralkyl, cycloalkyl, heterocyclics, ether, thioether, halogen, —$N(R)_2$, polyethylene polyamines, nitro groups, keto groups, ester groups, or carbonamide groups, alkyl substituted with the various functional groups described above.

In a nonlimiting example of an amidine, $R_{14}$ is hydrogen or $C_1$-$C_6$ alkyl; $R_{15}$ is $C_1$-$C_6$ alkyl, or an amine optionally substituted with $C_1$-$C_6$ alkyl or phenyl; $R_{16}$ and $R_{17}$ are hydrogen, $C_1$-$C_6$ alkyl or phenyl; and $R_{18}$, $R_{19}$, $R_{20}$ and $R_{21}$ are independently hydrogen or $C_1$-$C_6$ alkyl. A nonlimiting example of a metal amidine catalyst includes a zinc (II) amidine complex commercially available from King Industries of Norwalk Conn. under product code K-KAT® XK620.

The cure system including a metal catalyst and a trialkoxy functional aminosilane may include up to 40% by weight of the metal catalyst, such as 0.1% to 30% by weight, 0.1% to 20% by weight, 0.1% to 15% by weight, or 0.1% to 8% by weight based on the total weight of the cure system. For example, when the cure system includes a tin catalyst such as dibutyltin dilaurate, the cure system may include from 0.1% to 15% by weight, such as 0.1% to 8% by weight of the tin catalyst based on the total weight of the cure system. Alternatively, when the cure system includes a zinc catalyst such as zinc amidine, the cure system may include from 0.1% to 40% by weight, such as from 0.1% to 30% by weight of the zinc catalyst based on the total weight of the cure system.

The cure system including a metal catalyst and a trialkoxy functional aminosilane may be included in the coating composition at 10% to 30% by weight of the coating composition, such as from 10% to 20% by weight of the coating composition. The cure system can be added in an amount sufficient to provide an amine equivalent to epoxide equivalent ratio of 0.7:1.0 to 1.3:1.0 in the coating composition, such as 0.9:1.0 to 1.1:1.0, or even 0.95:1.00 to 1.05:1.00.

The present disclosure further provides an epoxy-polysiloxane polymer coating composition including a polysiloxane, a non-aromatic epoxide resin, and a cure system including (i) a polyurethane with a metal catalyst and (ii) an alkoxy functional aminosilane. The polyurethane of the cure system includes a reaction product of reactants including a polyisocyanate, a polyol, and the metal catalyst, wherein the metal catalyst may be coordinated with the polyurethane. As used herein, the term "coordinated" may be understood to mean that the metal ion can be bonded to several donor atoms of the polyurethane and may also be understood to mean only that the metal catalyst may be in close proximity to the polyurethane and may not be part of a coordination complex with the polyurethane.

The metal catalyst may be any of those disclosed hereinabove, such as those having the formula (IV) including manganese, zirconium, titanium, cobalt, iron, lead, bismuth, aluminum, zinc, or tin. The metal catalyst may be a metal amidine complex as defined hereinabove, i.e., having the formula $Me(A)_2(C)_2$ wherein A represents an amidine, C represents a carboxylate, and Me represents zinc, zirconium, bismuth, or aluminum. In a nonlimiting example of an amidine complex, A may have the formula (V) or (VI). The metal catalyst includes zinc amidine or dibutyltin dilaurate. Moreover, the alkoxy functional aminosilane (ii) of the cure system may be any of those having formulas II or III, as defined above.

The polyurethane of the cure system can include the reaction product of reactants including an aliphatic polyisocyanate and a polyol and can have a weight average molecular weight of 500 to 50,000 g/mol, such as 2,000 to 10,000 g/mol, absent the weight of the coordinated metal catalyst.

Nonlimiting examples of aliphatic polyisocyanates include at least aliphatic diisocyanates, such as hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof. The diisocyanate may include a blend of 4,4'-diphenylmethane diisocyanate (MDI) with 2,4'-diphenylmethane diisocyanate (such as Mondur ML diisocyanate available from Covestro AG, Pittsburgh, Pa.). Nonlimiting examples of polyols include at least alkyl diols and higher functionality polyols, such as selected from polyether polyols, polyester polyols, and combinations thereof.

The coating composition including a cure system that includes a polyurethane coordinate with a metal catalyst includes 1 ppm to 1000 ppm of the metal catalyst, such as 10 ppm to 100 ppm of the metal catalyst, or even 10 ppm to 50 ppm of the metal catalyst based on the total weight of the coating composition.

The present disclosure further provides an epoxy-polysiloxane polymer coating composition including a polysiloxane, a non-aromatic epoxide resin, and a cure system including (a) a silane-terminated polyurethane and (b) an alkoxy functional aminosilane, wherein the silane-terminated polyurethane (a) includes the reaction product of reactants including: (i) a polyurethane prepolymer component including a reaction product of reactants including a polyisocyanate, a polyol, and a metal catalyst, and (ii) an alkoxy functional silane different from the alkoxy functional aminosilane (b). The metal catalyst may be coordinated with the silane-terminated polyurethane.

The metal catalyst may be any of those disclosed hereinabove, such as those defined by formula (IV) including manganese, zirconium, titanium, cobalt, iron, lead, bismuth, aluminum, zinc, or tin. The metal catalyst may be a metal amidine complex as defined hereinabove, i.e., having the formula $Me(A)_2(C)_2$ wherein A represents an amidine, C represents a carboxylate, and Me represents zinc, zirconium, bismuth, or aluminum. In a nonlimiting example of an amidine complex, A may have the formula (V) or (VI). The metal catalyst includes zinc amidine or dibutyltin dilaurate. Moreover, the alkoxy functional aminosilane (b) of the cure system may be any of those having formulas II or III, as defined above.

The silane-terminated polyurethane of the cure system can include the reaction product of reactants including (i) a polyurethane prepolymer component and (ii) an alkoxy functional silane different from the alkoxy functional aminosilane (b), i.e., a silane endcap.

Nonlimiting examples of polyurethane prepolymers include the reaction product of reactants including an aliphatic diisocyanate and a polyol with a mole ratio of isocyanate groups to hydroxy groups of about 1:1 to about 2:1. Nonlimiting examples of aliphatic diisocyanates include hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof. The diisocyanate may include a blend of 4,4'-diphenylmethane diisocyanate (MDI) with 2,4'-diphenylmethane diisocyanate. Nonlimiting examples of diols include at least alkyl diols.

Nonlimiting examples of alkoxy-functional silanes (ii) useful as endcaps in forming the silane-terminated polyurethane include silanes having the formula (VII):

(VII)

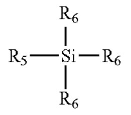

wherein $R_5$ is an isocyanate reactive functional group selected from $R_7NH—R_9—$, $HO—R_9—$, and $HS—R_9—$, wherein $R_7$ may be selected from H and alkyl groups having 1-6 carbon atoms, and $R_9$ may be selected from alkyl or alkylene groups having 1-10 linear, branched, or cyclic carbon groups; and each $R_6$ is independently selected from an aryl, alkyl, dialkylaryl, alkoxyalkyl, alkylaminoalkyl, or cycloalkyl radical, wherein at least one $R_6$ includes an alkoxyalkyl. In a nonlimiting example of an alkoxy-functional silane (ii), $R_6$ includes alkyl or alkoxyalkyl groups having 1-4 carbon atoms.

Nonlimiting examples of alkoxy functional silanes (ii) include aminosilanes, silanols, or mercaptosilanes having two methoxy groups, three methoxy groups, two ethoxy groups, three ethoxy groups, and combinations thereof. The aminosilane endcap can be selected from bis(trimethoxysilylpropyl)amine, 3-ethylamino-2-methylpropyl-trimethoxysilane, N-(n-butyl)-3-aminopropyl-trimethoxysilane, (3-mercapto propyl)-trimethoxysilane and combinations thereof. The silane terminated polyurethane can have a weight average molecular weight of 500 to 50,000 g/mol, such as 2,000 to 10,000 g/mol, absent the weight of the coordinated metal catalyst.

The silane terminated polymer of the cure system may be a polymer other than polyurethane, such as epoxy, amino, acrylamide, acryloxyl, acrylic, polyester, alkyd and hybrids thereof.

The coating composition including a cure system that includes a silane terminated polyurethane coordinate with a metal catalyst may include 1 ppm to 1000 ppm of the metal catalyst, such as 10 ppm to 100 ppm of the metal catalyst, or even 10 ppm to 50 ppm of the metal catalyst based on the weight of the coating composition.

In the epoxy polysiloxane coating compositions of the present disclosure, the proportion of the cure system to resin component may vary over a wide range. The coating compositions may include from 70% to 90% by weight of the polysiloxane and non-aromatic epoxy resin, and from 10% to 30% by weight of the cure system.

The catalyst, i.e., metal catalyst, may alternatively or additionally include an organic catalyst such as bicycloguanidine, an imidazole, an acid catalyst such as Nacure XC-346, an aliphatic or cyclic amine, a phosphonium salt, a phenolic or sulphonic acid or salt, or a tertiary amine or a quaternary ammonium salt. The catalyst, i.e., metal catalyst, may alternatively or additionally include, as nonlimiting examples, tetrabutylammonium fluoride or 1,8-diazabicyclo[5.4.0]undec-7-ene.

When an organic catalyst is included, either alone or in combination with a metal catalyst, the coating composition can include a cure system that includes a silane terminated polyurethane coordinate with an organic catalyst at from 1 ppm to 1000 ppm of the organic catalyst, such as 10 ppm to 100 ppm of the organic catalyst, or 10 ppm to 50 ppm of the organic catalyst based on the weight of the coating composition. The organic catalyst can replace the metal catalyst at levels described herein for the metal catalyst.

The coating compositions may include other components, including but not limited to, corrosion inhibitors, moisture scavengers, pigments, aggregates, rheological modifiers, plasticizers, antifoam agents, adhesion promoters, suspending agents, thixotropic agents, catalysts, pigment wetting agents, bituminous and asphaltic extenders, anti-settling agents, diluents, UV light stabilizers, air release agents, dispersing aids, solvents, surfactants, or mixtures of any thereof. One of ordinary skill in the resin coating compositions art would understand that other common components may be incorporated into the coating composition within the scope of the various aspects of the invention described herein. In specific examples, the epoxy polysiloxane coating composition may include up to 10% by weight of such components, combined or individually.

The coating composition may additionally include a corrosion inhibitor. Examples of suitable corrosion inhibitors include, but are not limited to, zinc phosphate-based corrosion inhibitors, for example, micronized HALOX® SZP-391, HALOX® 430 calcium phosphate, HALOX® ZP zinc phosphate, HALOX® SW-111 strontium phosphosilicate, HALOX® 720 mixed metal phosphor-carbonate, and HALOX® 550 and 650 proprietary organic corrosion inhibitors commercially available from Halox, Hammond, Ind. Other suitable corrosion inhibitors may include HEUCOPHOS® ZPA zinc aluminum phosphate and HEUCOPHOS® ZMP zinc molybdenum phosphate, commercially available from Heucotech Ltd, Fairless Hills, Pa. Corrosion inhibitors may be included into the coating composition in amounts of 1% to 7% by weight. The coating composition may additionally include a light stabilizer, such as liquid hindered amine light stabilizers ("HALS") or UV light stabilizers. Examples of suitable HALS include, for example, TINUVIN® HALS compounds such as TINUVIN® 292, TINUVIN® 123, TINUVIN® 622, TINUVIN® 783, TINUVIN® 770 commercially available from BASF, Ludwigshafen, Germany. Examples of suitable UV light stabilizers include, for example, CYASORB® light stabilizers, such as CYASORB® UV-1164L (2,4-bis(2,4-dimethylphenyl)-6-(2-hydroxy-4-isooctyloxyphenyl)-1,3,5-triazine), commercially available from Cytec Industries, Woodland Park, N.J. and TINUVIN® 1130 and TINUVIN® 328 commercially available from BASF, Ludwigshafen, Germany. The light stabilizer may be included into the coating composition in amounts of 0.25% to 4.0% by weight.

Suitable pigments for use in the coating compositions may be selected from organic or inorganic color pigments and may include, for example, titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that may be used to form the composition is understood to vary, depending on the particular composition application, and can be zero when a clear composition is desired. The epoxy polysiloxane composition may include up to 50% by weight fine particle size pigment or aggregate. Using greater than 50% by weight fine particle size pigment or aggregate ingredient may produce a composition that can be too viscous for application. In certain compositions where it is desirable to have more than 50% pigment or aggregate in the final composition, such as a zinc rich primer which contains up to 90% zinc in the dry film or a composition that may contain up to 80% pigment/aggregate, the pigment or aggregate may be packaged separately as a third component. Depending on the particular end use, the coating compositions may include from 20% to 35% by weight fine particle size aggregate or pigment.

The pigment and/or aggregate ingredient may typically be added to the epoxy resin portion of the resin component, for example, by dispersing with a Cowles mixer to at least 3 Hegman fineness of grind, or alternatively may be ball milled or sand milled to the same fineness of grind before addition of the polysiloxane ingredient. For example, selection of a fine particle size pigment or aggregate and dispersion or milling to 3 Hegman grind allows for the atomization of mixed resin and cure components with conventional air, air-assisted airless, airless and electrostatic spray equipment, and may provide a smooth, uniform surface appearance after application.

The epoxy-polysiloxane compositions of this disclosure may be formulated for application with conventional air, airless, air-assisted airless and electrostatic spray equipment, brush, or roller. Moreover, the compositions may be used as protective coatings for steel, galvanizing, aluminum, concrete and other substrates at dry film thicknesses in the range of from 25 micrometers to two millimeters. Accordingly, pigment or aggregate ingredients useful in forming the composition of the present disclosure may be selected from a fine particle size material, for example but not limited to, having at least 90 wt. % greater than 325 mesh U.S. sieve size.

The present disclosure further provides for an epoxy-polysiloxane polymer coating composition including:

from 70% to 90% by weight of a resin component including (a) a polysiloxane having the general formula I:

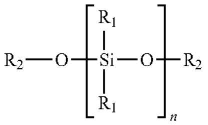

(I)

where $R_1$, $R_2$ and n are as described herein, and a non-aromatic epoxide resin having more than one 1,2-epoxide group per molecule and with an epoxide equivalent weight of from 100 to 5,000 g/mol, wherein the polysiloxane and the non-aromatic epoxide resin are provided in a ratio of 20:80 to 80:20; and from 10% to 30% by weight of a cure system including a metal catalyst or an organic catalyst and a trialkoxy functional aminosilane having formula (II):

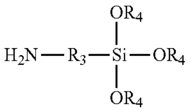

(II)

wherein $R_3$ and $R_4$ are as described herein, and wherein the metal catalyst includes the formula $Me(A)_2(C)_2$ wherein A represents an amidine, C represents a carboxylate, and Me represents zinc, wherein the amidine A may be represented by the formula (V) or (VI):

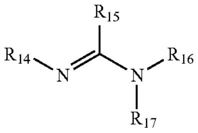

(V)

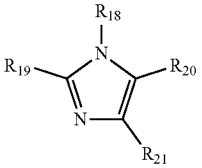

(VI)

wherein $R_{14}$ is hydrogen or $C_1$-$C_6$ alkyl, $R_{15}$ is $C_1$-$C_6$ alkyl or an amine optionally substituted with $C_1$-$C_6$ alkyl or phenyl, $R_{16}$ and $R_{17}$ are hydrogen, $C_1$-$C_6$ alkyl or phenyl, and $R_{18}$, $R_{19}$, $R_{20}$ and $R_{21}$ are independently hydrogen or $C_1$-$C_6$ alkyl, wherein the percent by weight is based on the total weight of the coating composition.

The present disclosure further provides for an epoxy-polysiloxane polymer coating composition including:

from 70% to 90% by weight of a resin component including a polysiloxane having the general formula I:

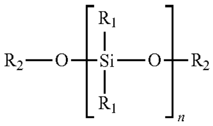

(I)

where $R_1$, $R_2$ and n are as described herein, and a non-aromatic epoxide resin having more than one 1,2-epoxide group per molecule and with an epoxide equivalent weight of from 100 to 5,000 g/mol, wherein the polysiloxane and the non-aromatic epoxide resin are provided in a ratio of 20:80 to 80:20; and from 10% to 30% by weight of a cure system including (a) a silane terminated polyurethane coordinated with a metal catalyst, and (b) a trialkoxy functional aminosilane having formula (II):

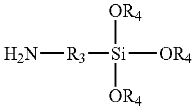
(II)

wherein $R_3$ and $R_4$ are as described herein, and wherein the silane terminated polyurethane (a) is the reaction product of reactants including (i) a polyurethane prepolymer component and (ii) an alkoxy functional silane different from the alkoxy functional aminosilane (b), wherein the polyurethane prepolymer component (i) includes the reaction product of reactants including an aliphatic diisocyanate, a polyol, and the metal catalyst or an organic catalyst; and wherein the alkoxy functional silane (ii) includes the formula (VII):

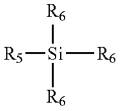
(VII)

wherein $R_5$ and $R_6$ are as defied herein, and the metal catalyst includes the formula $Me(A)_2(C)_2$ wherein A represents an amidine, C represents a carboxylate, and Me represents zinc, wherein the amidine A may be represented by the formula (V) or (VI):

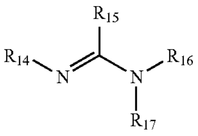
(V)

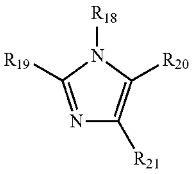
(VI)

wherein $R_{14}$ is hydrogen or $C_1$-$C_6$ alkyl, $R_{15}$ is $C_1$-$C_6$ alkyl or an amine optionally substituted with $C_1$-$C_6$ alkyl or phenyl, $R_{16}$ and $R_{17}$ are hydrogen, $C_1$-$C_6$ alkyl or phenyl, and $R_{18}$, $R_{19}$, $R_{20}$ and $R_{21}$ are independently hydrogen or $C_1$-$C_6$ alkyl, wherein the percent by weight is based on the total weight of the coating composition.

The present disclosure further yet provides for an epoxy-polysiloxane polymer coating composition including:

from 70% to 90% by weight of a resin component including a polysiloxane having the general formula I:

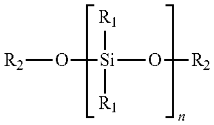
(I)

where $R_1$, $R_2$ and n are as described herein, and a non-aromatic epoxide resin having more than one 1,2-epoxide group per molecule and with an epoxide equivalent weight of from 100 to 5,000 g/mol, wherein the polysiloxane and the non-aromatic epoxide resin are provided in a ratio of 20:80 to 80:20; and from 10% to 30% by weight of a cure system including (a) a silane terminated polyurethane coordinated with dibutyltin dilaurate or zinc (II) amidine, and (b) a trialkoxy functional aminosilane having formula (II):

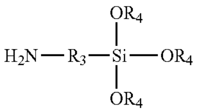
(II)

wherein $R_3$ and $R_4$ are as described herein; and wherein the silane terminated polyurethane (a) is the reaction product of reactants including (i) a polyurethane prepolymer component and (ii) an alkoxy functional silane different from the alkoxy functional aminosilane (b), wherein the polyurethane prepolymer component (i) includes the reaction product of reactants including an aliphatic diisocyanate, a polyol, and the dibutyltin dilaurate or zinc (II) amidine; and wherein the alkoxy functional silane (ii) includes the formula (VII):

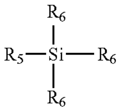
(VII)

wherein $R_5$ and $R_6$ are as defied herein, wherein the percent by weight is based on the total weight of the coating composition.

Epoxy-polysiloxane compositions of the present disclosure can be low in viscosity and can be spray applied without the addition of a solvent. However, organic solvents may be added to improve atomization and application with electrostatic spray equipment or to improve flow, leveling or appearance when applied by brush, roller, or standard air and airless spray equipment. Exemplary solvents useful for this purpose include, but are not limited to, esters, ethers, alcohols, ketones, glycols and the like. The amount of solvent added to compositions of the present disclosure may be limited by government regulation under the Clean Air Act to approximately 420 grams solvent per liter of the composition.

The epoxy-polysiloxane compositions of the present disclosure may be supplied as a two-package system, for example, in moisture proof containers. The first package may contain the epoxy resin, polysiloxane resin, any pigment or aggregate ingredient, additives, or solvent if desired. The second package may contain the cure system, including the alkoxy-functional aminosilane and the metal catalyst or organic catalyst, or the polyurethane coordinated with the metal catalyst. The coating compositions of the present disclosure may be supplied as 3-package systems where the pigment or aggregate are supplied in a separate package, e.g., for a flooring/concrete protection formulation or a zinc-rich primer coating.

Epoxy-polysiloxane compositions of the present disclosure can be applied and fully cure at ambient temperature conditions in the range of from −6° C. to 50° C. At temperatures below −18° C. cure may be slowed. However, the coating compositions disclosed herein may also be applied under bake or cure temperatures up to 40° C. to 120° C.

While not wishing to be bound by any particular theory, it is believed that the epoxy-polysiloxane coating compositions described herein are cured by: (1) the reaction of the epoxy resin with the cure system to form epoxy polymer chains; (2) the hydrolytic polycondensation of the polysiloxane ingredient to produce alcohol and polysiloxane polymer; and (3) the copolymerization of the epoxy polymer chains with the polysiloxane polymer to form a fully-cured epoxy-polysiloxane polymer composition. The amine residue of the aminosilane of the cure system may undergo an epoxy-amine addition reaction and the silane moiety of the aminosilane may undergo hydrolytic polycondensation with the polysiloxane. In its cured form, the epoxy-polysiloxane coating composition may exist as a uniformly dispersed arrangement of linear epoxy chain fragments that are cross-linked with a continuous polysiloxane polymer chain, thereby forming a non-interpenetrating polymer network (IPN) chemical structure that has substantial advantages over conventional epoxy systems.

In preparing the epoxy polysiloxane coating compositions of the present disclosure, the proportion of curing composition to resin component may vary over a wide range. In general, the epoxy resin may be cured with sufficient cure system where amine hydrogens react with the epoxide group of the epoxy resin to form epoxy chain polymers and with the polysiloxane to form polysiloxane polymers, where the epoxy chain polymers and polysiloxane polymers may copolymerize to form the cured cross-linked epoxy polysiloxane polymer composition. Inclusion of the metal catalyst coordinate with a silane-terminated polyurethane effectively concentrates these curing agents in close proximity to the substrate, i.e., the epoxy and polysiloxane resins, effecting faster cure rates. This has the further advantage that the concentration of metal catalyst or organic catalyst in the system effective at providing rapid cure rates is greatly reduced, such that less than 1000 ppm, 100 ppm, or even 50 ppm metal catalyst is effective at providing rapid sure rates, as opposed to the greater than 10,000 ppm levels of the metal catalysts provided in prior art compositions.

The present disclosure also relates to coated substrates, wherein the substrate may have a surface coated with any of the coating compositions described herein. The coating compositions of the present disclosure may be applied to a desired substrate surface to protect it from weathering, impact, and exposure to corrosion or chemical(s). Illustrative substrates that may be treated using the coating compositions described herein include, but are not limited to, wood, plastic, concrete, vitreous surfaces, and metallic surfaces. The coating compositions described herein may find use as a top coating disposed either directly onto the substrate surface itself or disposed onto a prior or other underlying coating, e.g., an inorganic or organic primer coating, disposed on the substrate surface to achieve a desired purpose.

The present disclosure further relates to methods for protecting a surface of a substrate from the undesired effects of chemical(s), corrosion, and weather by coating a surface of the substrate, such as a substrate as described herein, with any of the coating compositions described herein. Methods for preparing the coating compositions can include forming a resin component, adding a cure system to the resin component to form a fully cured epoxy-modified polysiloxane coating composition, and applying the coating composition to the surface of the substrate to be protected before the coating composition becomes fully cured. The resin component may be formed by combining a polysiloxane having formula I, and a non-aromatic epoxide resin having more than one 1,2-epoxide group per molecule with an epoxide equivalent weight in the range of from 100 to 5,000 g/mol. The cure system may be any of the cure systems described herein, such as (1) a blend of a trialkoxy functional aminosilane and a metal catalyst, such as zinc (II) amidine; or (2) a blend of a trialkoxy functional aminosilane and a polyurethane having a metal catalyst coordinated thereon; or (3) a blend of a trialkoxy functional aminosilane (a) and a silane-terminated polyurethane having a metal catalyst coordinated thereon (b), wherein the silane-terminated polyurethane is a reaction product of reactants including a polyurethane prepolymer and a silane endcap.

The coating compositions described herein can be applied to a surface to be treated by conventional techniques such as spraying or brushing or the like and are usually applied in films of from 50 to 250 micrometers in thickness, or up to 1.5 millimeters in thickness. If necessary, multiple layers of the coating composition may be applied to the surface to be protected. For example, for use with a wooden substrate, such as in the furniture industry, the coating may be applied with a dry film thickness of 75 to 125 micrometers to provide a desired degree of protection to the underlying surface. On other surface structures, coatings of appropriate thickness may be applied to provide the desired level of protection. The coating composition, once applied to the surface of the substrate may be allowed to cure at ambient temperature until fully cured or, alternatively, may be cured at an elevated temperature, from ambient temperature up to 150° C. to 200° C., for example, by placing the coated substrate in a drying or curing oven. The substrate may be removed from the oven after complete curing of the coating composition or after partial curing of the coating composition, after which the coating composition may continue to cure on the substrate at ambient temperature until complete cure is attained.

The following aspects are considered to be provided in the present disclosure:

Aspect 1: An epoxy-polysiloxane polymer coating composition including: (a) a polysiloxane; (b) a non-aromatic epoxide resin; and (c) a cure system including (i) a metal catalyst or an organic catalyst and (ii) an alkoxy functional aminosilane.

Aspect 2: The composition according to aspect 1, wherein the polysiloxane includes the formula:

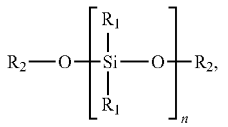

where each $R_1$ is independently selected from a hydroxy group or an alkyl, aryl, or alkoxy group having up to six carbon atoms; each $R_2$ is independently selected from hydrogen, or an alkyl or aryl group having up to six carbon atoms; and n is selected so that the molecular weight for the polysiloxane is 400 to 10,000 g/mol.

Aspect 3: The composition according to aspect 1 or 2, wherein the non-aromatic epoxide resin includes more than one 1,2-epoxide group per molecule with an epoxide equivalent weight of 100 to 5,000 g/mol.

Aspect 4: The composition according to any preceding aspect, wherein the non-aromatic epoxide resin includes a cycloaliphatic epoxide resin including a hydrogenated cyclohexane dimethanol or diglycidyl ether of a hydrogenated Bisphenol A epoxide resin.

Aspect 5: The composition according to any preceding aspect, wherein the alkoxy functional aminosilane (ii) of the cure system includes the formula:

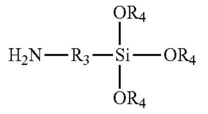

where $R_3$ is a difunctional organic radical including an aryl, alkyl, dialkylaryl, alkoxyalkyl, alkylaminoalkyl, or cycloalkyl radical, and each $R_4$ is independently selected from an alkyl, a hydroxyalkyl, an alkoxyalkyl, or a hydroxyalkoxyalkyl group containing less than six carbon atoms.

Aspect 6: The composition according to aspect 5, wherein $R_3$ is a difunctional organic radical selected from $(C_1-C_6)$ alkyl or $(C_1-C_6)$alkylamino$(C_1-C_6)$alkyl groups and each $R_4$ is independently a $(C_1-C_6)$alkyl group.

Aspect 7: The composition according to any preceding aspect, wherein the alkoxy functional aminosilane of the cure system includes aminopropyltrimethoxysilane, aminopropyltriethoxysilane, aminopropyltripropoxysilane, aminoneohexyltrimethoxysilane, N-β-aminoethyl-γ-aminopropyltrimethoxysilane, N-β-aminoethyl-γ-aminopropyltriethoxysilane, N-phenylaminopropyl trimethoxysilane, trimethoxysilylpropyl diethylene triamine, 3-(3-aminophenoxy) propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, or trisaminopropyl trismethoxyethoxysilane.

Aspect 8: The composition according to any preceding aspect, wherein the non-aromatic epoxide resin includes a cycloaliphatic epoxide resin including a hydrogenated cyclohexane dimethanol or diglycidyl ether of a hydrogenated Bisphenol A epoxide resin.

Aspect 9: The composition according to any preceding aspect, wherein the metal catalyst (i) of the cure system includes a zinc, manganese, zirconium, titanium, cobalt, iron, lead, bismuth, or tin catalyst.

Aspect 10: The composition according to any preceding aspect, wherein the metal catalyst (i) of the cure system includes the formula:

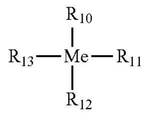

where Me is the metal, $R_{10}$ and $R_{11}$ may be independently selected from acyl, alkyl, aryl, or alkoxy groups having up to twelve carbon atoms, and $R_{12}$ and $R_{13}$ may be selected from those groups set forth for $R_{10}$ and $R_{11}$ or from inorganic atoms such as halogens, sulfur, or oxygen. The $R_{10}$, $R_{11}$, $R_{12}$ and $R_{13}$ groups may be selected from butyl, acetates, laurates, octanoates, neodecanoates or naphthanates.

Aspect 11: The composition according to one of aspects 1 to 9, wherein the metal catalyst (i) of the cure system includes the formula $Me(A)_2(C)_2$ wherein A represents an amidine, C represents a carboxylate, and Me represents a metal selected from zinc, zirconium, zinc, wherein the amidine A may be represented by either of the formulas:

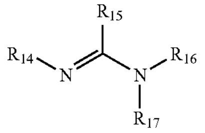

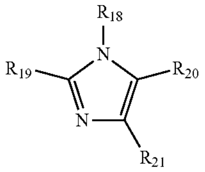

where $R_{14}$ is hydrogen or $C_1$-$C_6$ alkyl, $R_{15}$ is $C_1$-$C_6$ alkyl or an amine optionally substituted with $C_1$-$C_6$ alkyl or phenyl, $R_{16}$ and $R_{17}$ are hydrogen, $C_1$-$C_6$ alkyl or phenyl, and $R_{18}$, $R_{19}$, $R_{20}$ and $R_{21}$ are independently hydrogen or $C_1$-$C_6$ alkyl.

Aspect 12: The composition according to any one of aspects 1 to 9, wherein the metal catalyst includes zinc amidine or dibutyltin dilaurate.

Aspect 13: The composition according to any preceding aspect, wherein the cure system further includes a polyurethane coordinated with the metal catalyst.

Aspect 14: The composition according to aspect 13, wherein the polyurethane coordinated with the metal catalyst includes a polyurethane prepolymer that is a reaction product of reactants including an aliphatic polyisocyanate, a polyol, and the metal catalyst.

Aspect 15: The composition according to aspect 14, wherein the polyurethane prepolymer is further reacted with an alkoxy functional silane different from the alkoxy functional aminosilane (b) of the cure system to form a silane-terminated polyurethane.

Aspect 16: The composition according to aspect 15, wherein the alkoxy functional silane different from the alkoxy functional aminosilane (ii) of the cure system has the formula:

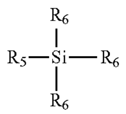

where $R_5$ is an isocyanate reactive functional group selected from $NHR_7$, SH, and OH, wherein $R_7$ includes H or alkyl groups having 1-6 carbon atoms; and each $R_6$ is independently selected from an aryl, alkyl, dialkylaryl, alkoxyalkyl, alkylaminoalkyl, or cycloalkyl radical, wherein at least one $R_6$ includes an alkoxyalkyl.

Aspect 17: The composition according to any one of aspects 13 to 16, wherein the weight average molecular weight for the polyurethane of the cure system is 500 to 50,000 g/mol, such as 2,000 to 10,000 g/mol.

Aspect 18: The composition according to any one of aspects 13 to 17, including 1 ppm to 1000 ppm of the metal cure accelerator, such as 10 ppm to 100 ppm of the metal catalyst, or 10 ppm to 50 ppm of the metal catalyst.

Aspect 19: The composition according to any preceding aspect, wherein the coating composition includes from 20% to 70% by weight of the polysiloxane, from 20% to 70% by weight of the non-aromatic epoxy resin.

Aspect 20: The composition according to any preceding aspect, including from 70% to 90% by weight of the polysiloxane and non-aromatic epoxy resin, and from 10% to 30% by weight of the cure system, wherein the percent by weight is based on a total weight of the coating composition.

Aspect 21: The composition according to any preceding aspect, wherein the polysiloxane and non-aromatic epoxy resin are provided in a ratio of 20:80 to 80:20.

Aspect 22: The composition according to any preceding aspect, wherein the organic catalyst is selected from bicycloguanidine, an imidazole, an acid catalyst, an aliphatic or cyclic amine, a phosphonium salt, a phenolic acid or salt, a sulphonic acid or salt, a tertiary amine and a quaternary ammonium salt.

Aspect 23: The composition according to any preceding aspect, wherein the organic catalyst comprises tetrabutylammonium fluoride.

Aspect 24: The composition according to any preceding aspect, wherein the organic catalyst comprises 1,8-diazabicyclo[5.4.0]undec-7-ene.

Aspect 25: A coated substrate including a surface coated with the coating composition according to any one or aspects 1 to 24, wherein the dry hard times for the coating composition on the substrate measured according to ASTM-D5895 at 21 C are essentially the same at 20% and 60% relative humidity.

Aspect 26: A method for coating a surface with a coating composition, the method including: preparing a resin component including a polysiloxane and a non-aromatic epoxide resin and adding a cure system to the resin component to form a fully cured epoxy-modified polysiloxane coating composition, wherein the polysiloxane, the non-aromatic epoxide resin, and the cure system are as defined in any of aspects 1 to 24.

These and other features of the coating compositions and coated substrates of the present disclosure will become more apparent upon consideration of the following examples. Whereas particular examples of this invention are described below for purposes of illustration, it will be evident to those skilled in the art that numerous variations of the details of the present invention may be made without departing from the invention as defined in the appended claims. All parts and percentages in the examples, as well as throughout this specification, are by weight unless otherwise indicated.

EXAMPLES

All parts and percentages in the examples, as well as throughout the specifications, are by weight unless otherwise indicated.

Example 1: Preparation of Polyurethane-Zinc Curing System

A 1-liter flask was equipped with a motor driven stainless steel stir blade, a water-cooled condenser, a nitrogen inlet, and a heating mantle with a thermometer connected through a temperature feedback control device. Added to the 1-liter flask was 155.1 g Desmodur N3600 (isocyanate), 9 g vinyl trimethoxy silane (VTMS), 0.2 g of Zinc Amidine (catalyst) and 207.2 g xylene. The flask was heated to 50° C. At this temperature 14.7 g of 1,6-hexanediol (chain extender) was added while maintaining temperature below 60 C. This batch was held for 30 minutes at 60° C. After this hold, the in-process isocyanate equivalent weight was measured, and when it is found to be at about the theory equivalent weight of 665, a capping agent was added (138.1 g of Dynasylan1189) was added dropwise maintaining the temperature at below 70° C. After the addition, the batch was held for 30 minutes at 70° C. The reaction was monitored by the disappearance of the isocyanate NCO peak at 2200 cm−1 by Infra-Red spectroscopy, after which the heat was discontinued, and the batch cooled. The resulting polyurethane resin was 57% solids.

Example 2: Preparation of Polyurethane-Tin Curing System

A 1-liter flask was equipped with a motor driven stainless steel stir blade, a water-cooled condenser, a nitrogen inlet, and a heating mantle with a thermometer connected through a temperature feedback control device. Added to the 1-liter flask was 146 g Desmodur N3600 (isocyanate), 8.5 g vinyl trimethoxy silane (VTMS), 0.2 g of dibutyltin dilaurate (catalyst) and 195 g xylene. The flask was heated to 50° C. At this temperature 13.8 g of 1,6-hexanediol (chain extender) was added while maintaining temperature below 60° C. This batch was held for 30 minutes at 60° C. After this hold, the in-process isocyanate equivalent weight was measured, and when it is found to be at about the theory equivalent weight of 654, a capping agent (132.2 g of Dynasylan 1189) was added dropwise while maintaining temperature below 70° C. After the addition, the batch was held for 30 minutes at 70° C. The reaction was monitored by the disappearance of the isocyanate NCO peak at 2200 cm−1 by Infra-Red spectroscopy, after which the heat was discontinued, and the batch cooled. The resulting polyurethane resin was 57% solids.

Examples 3-7 Siloxane Paint Formulation

Paint formula Examples 3-7 were all prepared using a similar procedure, as outlined herein: cure systems including an alkoxy functional aminosilane, a metal catalyst (tin or zinc), or the selected resin complex from Example 1 or 2 were mixed by weight fraction, according to Table 1. The intermediate was allowed to stand overnight and was then then mixed with 100 parts of a polysiloxane-epoxy resin. The drying properties were measured and recorded (Table 1).

A film of paint was applied with a BA-30 (Bird applicator) with an opening size of 150 microns. Drying properties were measured at 21° C. for 20% and 60% relative humidity with a BK10 Dry Time Recorder (purchased from Cavey Laboratory Engineering Co. LTD) in accordance with ASTM-D5895.

As the hydrolysis process of siloxane coatings is slow at low humidity, 20% relative humidity was chosen to differentiate among the various combinations studied. It takes 10 hours to cure the coating using a cure system including an aminosilane without a metal catalyst (Example 4). Addition of a tin catalyst was found to reduce the drying time by as much as 2 hours at 20% relative humidity (Example 3), but at the cost of reduced pot-life and shelf-life. A zinc amidine catalyst was also found to be effective, especially at a concentration of 50 k ppm (Example 5). Surprisingly, the polyurethane-silane-zinc or -tin complex including less than 50 ppm metals showed faster dry times at both 20% and 60% relative humidity (i.e., dry times of Examples 6 and 7 were shorter that the dry time of Example 5).

More surprisingly, the polyurethane-silane-zinc complex also improved the application humidity robustness of the siloxane coating. In the case where the metal catalyst is not used, the drying time of the paint is slower by more than 2 hours at 20% relative humidity than at 60% relative humidity (Example 4). Inclusion of the tin catalyst, such as with the aminosilane (Example 3) showed a slight improvement in humidity robustness, while the zinc catalyst showed similar dry times at both relative humidity conditions (Example 5). Interestingly, the cure system including a silane-terminated polyurethane with the zinc catalyst had greatly reduced dry hard times that appeared nearly independent of the relative humidity. This moisture independent silane cure chemistry is unprecedented.

TABLE 1

| Examples | Exp 3 | Exp 4 | Exp 5 | Exp 6 | Exp 7 |
|---|---|---|---|---|---|
| | part per weight | | | | |
| [1]polysiloxane - epoxy base | 100 | 100 | 100 | 100 | 100 |
| [2]alkoxy functional aminosilane | 15.2 | 15.2 | 15.2 | 15.2 | 15.2 |
| [3]DBTDL | 1.12 | 0 | 0 | 0 | 0 |
| [4]K-KAT XK-620 | 0 | 0 | 5.76 | 0 | 0 |
| Resin Complex Example 1 | 0 | 0 | 0 | 5.76 | 0 |
| Resin Complex Example 2 | 0 | 0 | 0 | 0 | 5.76 |
| | properties | | | | |
| Calculated metal catalyst concentration in the final mixture, ppm | 14,000 | 0 | 50,000 | 15.2 | 22.9 |
| 20% Humidity Dry Hard Time @ ASTM-D5895, Hrs | 8.0 | 10.1 | 7.8 | 5 | 4.1 |
| 60% Humidity Dry Hard Time @ ASTM-D5895, Hrs | 6.5 | 7.6 | 8.2 | 4.9 | Not Available |

[1]polysiloxane-epoxy base is a pigmented epoxy-silicone mixture, available at PPG Industries (PSX ®700) including an epoxide resin and a polysiloxane in a ratio of 20:80 to 80:20

[2]3-aminopropyltriethoxysilane is available from Sigma Aldrich

[3]DBTDL (Dibutyltin dilaurate) is a tin catalyst available from Sigma-Aldrich

[4]K-KAT XK-620 is a zinc-amidine catalyst available from King Industries

Example 8: Preparation of Polyurethane—Zirconium Chelate Curing System

A composition was prepared as outlined in Example 1, except that Zinc Amidine was replaced with a Zirconium Chelate Complex, KKAT-6212 available from King Industries, Norwalk, CT.

Example 9: Preparation of Polyurethane—Zinc Catalyst Curing System

A composition was prepared as outlined in Example 1, except that Zinc Amidine was replaced with Zinc Catalyst, K-KAT XK-633 available from King Industries, Norwalk, CT.

Example 10: Preparation of Polyurethane—1,8-diazabicyclo[5.4.0]undec-7-ene Curing System A composition was prepared as outlined in Example 1, except that Zinc Amidine was replaced with 1,8-diazabicyclo[5.4.0]undec-7-ene.

Paint formula Examples 11-14 were all prepared and evaluated using similar procedures as outlined for Paint formula Examples 3-7 and are summarized in Table 2.

TABLE 2

| Examples | Exp 11 | Exp 12 | Exp 13 | Exp 14 |
|---|---|---|---|---|
| [1]polysiloxane - epoxy base | 100 | 100 | 100 | 100 |
| [2]alkoxy functional aminosilane | 15.2 | 15.2 | 15.2 | 15.2 |
| Resin Complex Example 8 | 5.76 | 0 | 0 | 0 |
| Resin Complex Example 9 | 0 | 5.76 | 0 | 0 |
| Resin Complex Example 10 | 0 | 0 | 5.76 | 0 |
| [5] Borchi Kat 0244 | 0 | 0 | 0 | 5.76 |
| Calculated metal catalyst concentration in the final mixture, ppm | 15.2 | 15.2 | 15.2 | 50,000 |

TABLE 2-continued

| Examples | Exp 11 | Exp 12 | Exp 13 | Exp 14 |
|---|---|---|---|---|
| 60% Humidity Dry Hard Time @ ASTM-D5895, Hrs | 4.1 | 5.6 | 6.5 | 9.16 |

[1]polysiloxane-epoxy base is a pigmented epoxy-silicone mixture, available at PPG Industries (PSX ®700) comprising an epoxide resin and a polysiloxane in a ratio of 20:80 to 80:20

[2]3-aminopropyltriethoxysilane is available from Sigma Aldrich

[5] Bismuth Tris(2-ethylhexanoate) + Hexanoic acid available from Borchers Inc., Westlake, OH The curing systems containing zirconium, zinc and bismuth composition based curing systems exhibited excellent 60% Humidity Dry Hard Times. The 1,8-diazabicyclo[5.4.0]undec-7-ene curing system also performed very well, demonstrating that tertiary amines and quaternary ammonium salt based curing systems can be used in the epoxy polysiloxane coating compositions described herein.

Whereas particular embodiments of this invention have been described above for purposes of illustration, it will be evident to those skilled in the art that numerous variations of the details of the present invention may be made without departing from the invention as defined in the appended claims.

What is claimed is:

1. An epoxy-polysiloxane polymer coating composition comprising:

(a) a polysiloxane;

(b) a non-aromatic epoxide resin; and (c) a cure system comprising (i) a polyurethane coordinated with a metal catalyst or an organic catalyst, and (ii) an alkoxy functional aminosilane, wherein the polyurethane comprises a silane terminated polyurethane.

2. The composition according to claim 1, wherein the metal catalyst comprises a zinc, manganese, zirconium, titanium, cobalt, iron, lead, bismuth, or tin catalyst.

3. The composition according to claim 1, wherein the metal catalyst comprises zinc amidine or dibutyltin dilaurate.

4. The composition according to claim 1, wherein the silane terminated polyurethane is an aminosilane capped polyurethane.

5. The composition according to claim 1, wherein the polyurethane coordinated with the metal catalyst (i) comprises a polyurethane prepolymer that is a reaction product of reactants comprising an aliphatic polyisocyanate, a diol, and the metal catalyst, wherein the metal catalyst comprises a zinc catalyst, a manganese catalyst, a zirconium catalyst, a titanium catalyst, a cobalt catalyst, an iron catalyst, a lead catalyst, a bismuth catalyst, a tin catalyst, or a combination thereof.

6. The composition according to claim 5, wherein the polyurethane coordinated with the metal catalyst (i) comprises the polyurethane prepolymer further reacted with an alkoxy functional silane different from the alkoxy functional aminosilane (ii) of the cure system.

7. The composition according to claim 6, wherein the alkoxy functional silane different from the alkoxy functional aminosilane (ii) of the cure system comprises an alkoxy functional amino silane or alkoxy functional silanol.

8. The composition according to claim 1, wherein the polysiloxane has the formula:

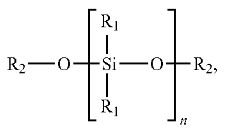

wherein each $R_1$ is independently selected from a hydroxy group or an alkyl, aryl, or alkoxy group having up to six carbon atoms, each $R_2$ is independently selected from hydrogen, or an alkyl or aryl group having up to six carbon atoms, and n is selected so that the weight average molecular weight for the polysiloxane is 400 to 10,000 g/mol.

9. The composition according to claim 1, wherein the polysiloxane and non-aromatic epoxy resin are supplied in a ratio of 20:80 to 80:20.

10. The composition according to claim 1, wherein the non-aromatic epoxide resin has more than one 1,2-epoxide group per molecule and an epoxide equivalent weight of 100 to 5,000 g/mol.

11. The composition according to claim 1, wherein the alkoxy functional aminosilane of the cure system comprises a general formula

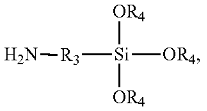

wherein $R_3$ is a difunctional organic radical comprising an aryl, alkyl, dialkylaryl, alkoxyalkyl, alkylaminoalkyl, or cycloalkyl radical, and each $R_4$ is independently selected from an alkyl, hydroxyalkyl, alkoxyalkyl, or hydroxyalkoxyalkyl group comprising less than six carbon atoms.

12. The composition according to claim 1, wherein the alkoxy functional aminosilane of the cure system comprises aminopropyltrimethoxysilane, aminopropyltriethoxysilane, aminopropyltripropoxysilane, aminoneohexyltrimethoxysilane, N-β-aminoethyl-γ-aminopropyltrimethoxysilane, N-β-aminoethyl-γ-aminopropyltriethoxysilane, N-phenylaminopropyl trimethoxysilane, trimethoxysilylpropyl diethylene triamine, 3-(3-aminophenoxy) propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, or trisaminopropyl trismethoxyethoxysilane.

13. The composition according to claim 1, wherein the organic catalyst is selected from bicycloguanidine, an imidazole, an acid catalyst, an aliphatic or cyclic amine, a phosphonium salt, a phenolic acid or salt, a sulphonic acid or salt, a tertiary amine and a quaternary ammonium salt.

14. The composition according to claim 1, wherein the organic catalyst comprises tetrabutylammonium fluoride and/or 1,8-diazabicyclo[5.4.0]undec-7-ene.

15. A coated substrate comprising a surface coated with the coating composition according to claim 1, wherein the dry hard times for the coating composition on the substrate measured according to ASTM-D5895 at 21° C. are essentially the same at 20% and 60% relative humidity.

16. The composition according to claim 1, wherein the cure system comprises (a) a silane-terminated polyurethane and (b) an alkoxy functional aminosilane, wherein the silane-terminated polyurethane (a) comprises the reaction product of reactants comprising:

(i) a polyurethane prepolymer component comprising a reaction product of reactants comprising a polyisocyanate, a polyol, and a metal catalyst or an organic catalyst, and (ii) an alkoxy functional silane different from the alkoxy functional aminosilane (b), wherein the metal catalyst is coordinated with the silane-terminated polyurethane.

17. The composition according to claim 1, wherein the polysiloxane (a) has the formula

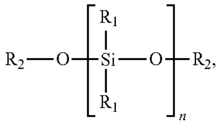

wherein each $R_1$ is independently selected from a hydroxy group or an alkyl, aryl, or alkoxy group having up to six carbon atoms, each $R_2$ is independently selected from hydrogen, or an alkyl or aryl group having up to six carbon atoms, and n is selected so that the molecular weight for the polysiloxane is 400 to 10,000 g/mol;

the non-aromatic epoxide resin (b) has more than one 1,2-epoxide group per molecule with an epoxide equivalent weight of 100 to 5,000 g/mol; and the cure system (c) comprises 1,8-diazabicyclo[5.4.0]undec-7-ene and an alkoxy functional aminosilane.

18. A method for coating a surface with a coating composition, the method comprising:

preparing a resin component comprising:

a polysiloxane having the formula

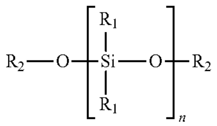

wherein, each $R_1$ is independently selected from a hydroxy group or an alkyl, aryl, or alkoxy group having up to six carbon atoms, each $R_2$ is independently selected from hydrogen or an alkyl or aryl group having up to six carbon atoms, and where n is selected so that the molecular weight for the polysiloxane is 400 to 10,000 g/mol; and a non-aromatic epoxide resin having more than one 1,2-epoxide group per molecule and an epoxide equivalent weight of 100 to 5,000 g/mol;

adding a cure system to the resin component to form a fully cured epoxy-modified polysiloxane coating composition, the cure system comprising (i) a polyurethane coordinated with a metal catalyst, and (ii) an alkoxy functional aminosilane; and applying the coating composition to a surface of a substrate to be protected before the coating composition becomes fully cured.

19. The composition according to claim 1, wherein the metal catalyst or the organic catalyst is included in the composition at from 1 ppm to 1000 ppm.

* * * * *